April 16, 1935.  H. M. SHORT  1,997,700
RESERVE ENGINE LUBRICATING OR FLUID DELIVERY APPARATUS
Filed Nov. 16, 1933  2 Sheets-Sheet 1

INVENTOR
Henry M. Short,
BY
Fraser, Myers & Manley
ATTORNEYS.

April 16, 1935.  H. M. SHORT  1,997,700
RESERVE ENGINE LUBRICATING OR FLUID DELIVERY APPARATUS
Filed Nov. 16, 1933   2 Sheets-Sheet 2
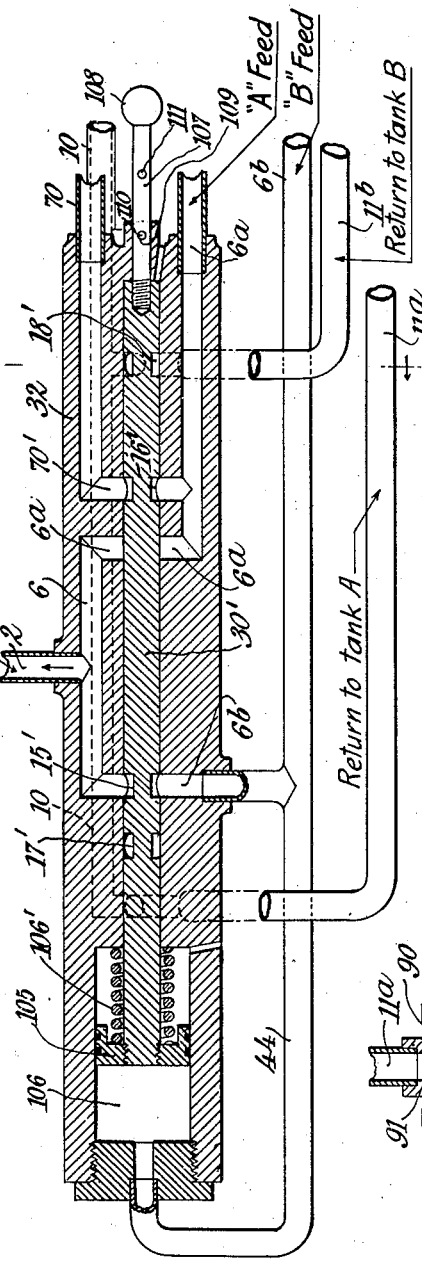
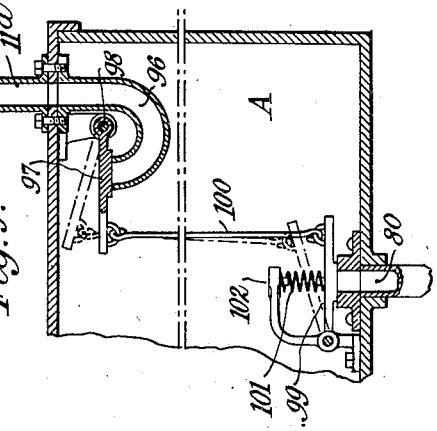
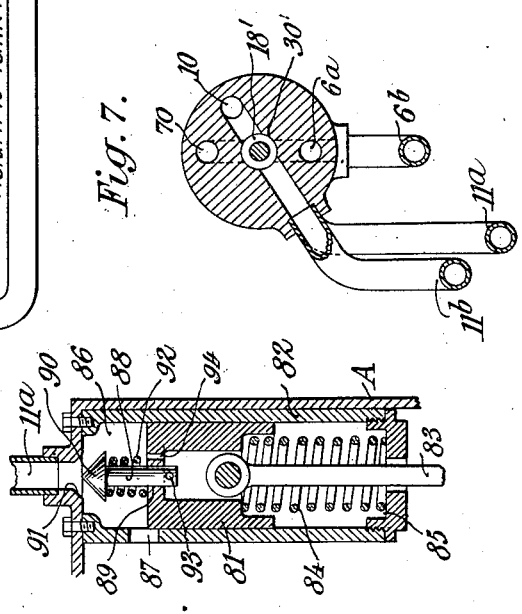
INVENTOR
*Henry M. Short,*
BY
*Fraser, Myers + Manley*
ATTORNEYS.

Patented Apr. 16, 1935

1,997,700

UNITED STATES PATENT OFFICE 1,997,700

RESERVE ENGINE LUBRICATING OR FLUID DELIVERY APPARATUS

Henry M. Short, Penn Yan, N. Y., assignor of one-half to Charles F. Robbins, Glenora, N. Y., and one-half to Peter Thompson, Penn Yan, N. Y.

Application November 16, 1933, Serial No. 698,299

19 Claims. (Cl. 184—6)

This invention relates to apparatus which is particularly adapted for increasing the safety and reliability of supplying fluid to an internal combustion engine or to other mechanism requiring a continuous supply of lubricant or other fluid for its safe operation.

One object of the invention is to provide a reserve system for supplying lubricant to the bearings of an engine with means whereby, if the normally operative system fails to properly lubricate the engine, the reserve system will be automatically connected with said engine whereby to maintain a substantially uninterrupted delivery of lubricant to the engine bearings.

A further object of the invention is to provide two or more reservoirs which may be selectively connected in the circulating lubricating system of an engine in such manner that the lubricant will be returned automatically to the reservoir from which it is drawn.

A further object of the invention is to provide automatic valve means sensitive to pressure and/or temperature of the lubricant for switching from one reservoir to another whereby to maintain a substantially continuous flow of lubricant to the engine bearings under controlled conditions of pressure and/or temperature.

The invention further aims to provide automatic valve mechanism for switching from one reservoir to another rapidly, even though the change in condition of the lubricant which may initiate the automatic action of said valve mechanism, be very gradual.

This mechanism is preferably designed to maintain the valve in the position to which it is automatically shifted by a predetermined change in pressure of the lubricant regardless of subsequent fluctuations in such pressure within predetermined limits. Thus, for example, if the valve is caused to change its position to connect a different reservoir to the engine when the pressure of the lubricant rises above a predetermined point, the valve will be prevented from returning to its original position even though the pressure falls somewhat below that pressure which initiated the aforesaid valve movement. In the absence of such provision there might arise, under certain conditions, a tendency for the valve to flutter from one control position to another.

The invention further provides an automatically controlled valve for each of the reservoirs associated with the lubricant circulating system of an engine, said valve being adapted to close the reservoir outlet automatically whenever the return flow of oil from the engine to said reservoir is interrupted. A reservoir thus equipped will retain a body of lubricant even though the supply or return conduit connecting such reservoir with the engine be broken. A breakage of either conduit will interrupt the circulation and thus prevent the return of lubricant from the engine to the connected reservoir. Upon failure of the lubricant to return the aforesaid automatic valve mechanism acts to prevent further loss of lubricant from the said reservoir, the lubricant thus saved being available for use in the reserve or emergency lubricant supply system according to the present invention.

A still further object of the invention is to provide a valved communication between reservoirs, each of which may be selectively connected to the engine. This makes it possible to transfer the fluid from the first reservoir to the second should it be necessary to disconnect said first reservoir from the engine because of some defect external to said first reservoir which would interfere with its normal delivery of fluid to the engine.

In the art of aviation one of the primary hazards is that of engine failure. And such failure is not infrequently attributable to some defect in the lubricating system. The apparatus according to the present invention serves to materially minimize the possibility of defective engine lubrication by providing independent reservoirs, and preferably, independent pumps for delivering lubricant to the engine. Any exposed conduit extending from the engine to a reservoir at a remote point is subject to derangement or structural failure due to the continuous vibration to which it is subjected in the normal operation of an airplane. Beyond the ordinary hazards, it will be evident that in aircraft employed in military combat, the possibility of the engine being rendered inoperative through the puncture of a reservoir or cutting of the communication between it and the engine as a result of machine gun or artillery fire is greatly increased. The present invention permits of largely reducing the hazard of engine failure from such causes, and this is accomplished automatically so that without any attention on the part of the pilot, reserve lubricating apparatus will be brought into operation upon the development of a material defect in the apparatus then acting to supply lubricant to the engine. Should a conduit connecting one of the reservoirs with the engine be broken, the automatic valve mechanism of the present invention will cut off communication between the broken conduit and the engine and will establish communication with the reserve supply of lubricant in another reservoir. The present invention also provides for conserving the lubricant remaining in the first reservoir by the automatic closure of the reservoir outlet upon failure of the conduit connecting such outlet with the engine.

It will be apparent that the present invention is generally applicable to the problem of maintaining a reliable delivery of fluid to any character of mechanism and is not confined to use in connection with aircraft engines.

Further objects of the invention will be apparent from the following description, in which reference is had to the accompanying figures, and wherein:

Fig. 4 is a vertical axial section showing the construction of the individual valve control mechanism provided in each of the reservoirs as seen in Fig. 1 in smaller scale.

Fig. 5 is a vertical cross-section showing the construction of a modified form of automatically controlled reservoir valve.

Fig. 6 is a vertical axial section showing a modified form of selector valve mechanism.

Fig. 7 is a transverse cross-section taken along the line VII—VII of Fig. 6.

Figure 1:
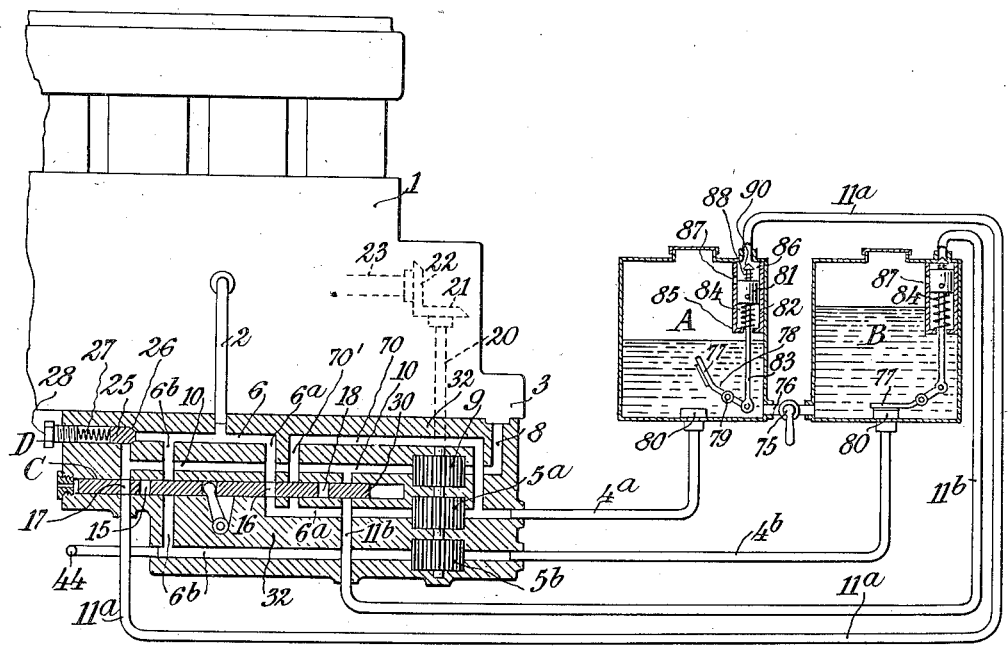
Figure 1 is a schematic diagram partially in section, showing a preferred embodiment of the present invention, wherein there is provided automatic valve mechanism and connections with the reservoirs whereby lubricant is circulated through the bearings of an internal combustion engine.

The present invention as applied to the problem of supplying lubricant to an internal combustion engine, will best be understood in its general aspects by reference to Fig. 1, wherein the internal combustion engine is indicated at 1. This engine may be provided with any usual system of internal oil conduits (not shown) through which lubricant is fed under pressure to the various bearings. The lubricant is fed to the engine through a main supply passage or conduit 2, and after its passage through the bearings the oil flows to the engine sump 3, from whence it is withdrawn by means of a scavenging pump and returned to the external storage system.

In the present embodiment two reservoirs are provided, these being indicated at A and B. These reservoirs are connected respectively through individual supply conduits 4a, 4b, with gear pumps 5a, 5b, which, in turn, selectively deliver the oil under pressure to the main feed conduit 2 either through the conduit 6a or 6b. After the oil passes through the engine bearings and returns to the sump 3, as hereinbefore set forth, it flows through the sump outlet 8 to the scavenging pump 9, which, in turn, forces the oil through conduit 10, thence selectively through either conduit 11a or 11b to the reservoirs A, B, respectively.

The device which determines which of the reservoirs shall be in communication with the main supply and return conduits or passages 2, 8, comprises a selector valve C, which, in alternative positions, is adapted to establish free communication between said conduits and the reservoirs A or B, depending upon the position of the valve. This valve may be of any type suitable for controlling a plurality of passages. In the embodiment shown in Figs. 1, 2 and 3, the movable valve member consists of a plunger 30 freely slidable within a closely fitting bore 31 formed in the valve block or casing 32.

The plunger of the selector valve C is provided with ports 15, 16, which, in alternative positions of the plunger, register respectively with the supply conduits 6a, 6b. With the valve plunger in the position shown in Fig. 1, port 16 registers with conduit 6a so that oil is delivered from the "A" reservoir to the main engine-supply conduit 2. In this position of the plunger the port 15 does not register with conduit 6b and consequently the "B" reservoir is cut off from the engine-supply conduit 2. A similar situation exists with respect to the return conduits 11a, 11b, which are controlled respectively by the ports 17, 18. With the valve in the position shown in Fig. 1, port 17 registers with return conduit 11a, thus permitting free return of the oil from the engine sump through passage 8, pump 9 and conduits 10, 11a to the "A" reservoir. With the valve plunger in this position, the port 18 does not register with conduit 11b, and consequently no oil will be returned to the "B" reservoir. It will thus be seen that with the above described valve setting, the reservoir A is connected in the oil circulating system in such manner that a continuous circulation will occur from said reservoir to the engine and return. On the other hand, both the supply and return conduits of the reservoir B are closed, so that the supply of oil in the latter reservoir is effectively segregated from that in reservoir A. Under these conditions the "A" system will continue to function regardless of any derangement or loss of oil that might occur in the "B" system.

With the valve plunger in its other, or what may be termed the normal control position, the above described condition is just reversed. Valve port 15 will register with conduit 6b so that oil will be delivered from reservoir B to the main supply conduit 2; port 18 will register with conduit 11b, so that oil will return by the scavenging pump 9 through conduits 10, 11b, to reservoir B. Valve plunger 30', as shown in Fig. 6, exemplifies the last described position of valve plunger 30.

The oil pumps may be of any desired type, although the conventional gear type pump which is generally employed in force-feed lubricating systems, is preferred. Such pumps are so well understood by those skilled in the art that it is deemed unnecessary to describe them in detail. The driving gears of the delivery pumps 5a, 5b, and the driving gear of the scavenging pump 9 may be conveniently connected to a common drive shaft 20 which receives power through bevel gearing 21, 22, directly from the engine crank shaft 23. These pumps may be provided with relief valves in accordance with conventional practice whereby to prevent the development of excessive pressures. A valve of this character is shown at D (Fig. 1) and consists of a plunger 25 which is held against a conical valve seat 26 by spring 27, the tension of the spring being regulated by the adjustment of screw 28 which is threaded into the end of the bore within which the said spring and plunger are mounted. This relief valve D is interposed between the supply and return conduits, so that any excess pressure delivered to conduit 2 will open the valve and permit a sufficient flow of oil through either conduit 11a or 11b to one or the other of the reservoirs, so that the pressure in the main supply conduit 2 will never exceed a predetermined value. While such a valve is not indispensable, it affords the advantage of insuring a more nearly uniform delivery of oil to the engine bearings and has the further function of protecting the pumps from unnecessary loads. As above set forth, each of the pumps may be provided with individual relief valves, if desired.

In the preferred embodiment of the invention automatic mechanism is provided for controlling the action of the selector valve C. This mechanism, when applied to a pressure-feed lubricating system as hereinbefore described, is advantageously controlled by the pressure delivered by one of the pumps to the main supply conduit 2. With such an arrangement the valve mechanism will remain in a predetermined position so long as a normal delivery of oil continues from the reservoir then operatively connected with the engine. Upon failure of such delivery either through normal exhaustion of the oil in said reservoir or because of leakage therein or in the supply conduit connecting said reservoir with its pump, or because of defective operation of such pump, the pressure of oil delivered to the main supply conduit 2 will fall below a predetermined normal value, and this change in pressure is utilized to bring about the automatic shifting of the selector valve so that it will cut out the exhausted or defective side of the lubricating system and will connect the reserve supply so that a normal circulation of oil through the engine will be automatically restored.

Figure 2:
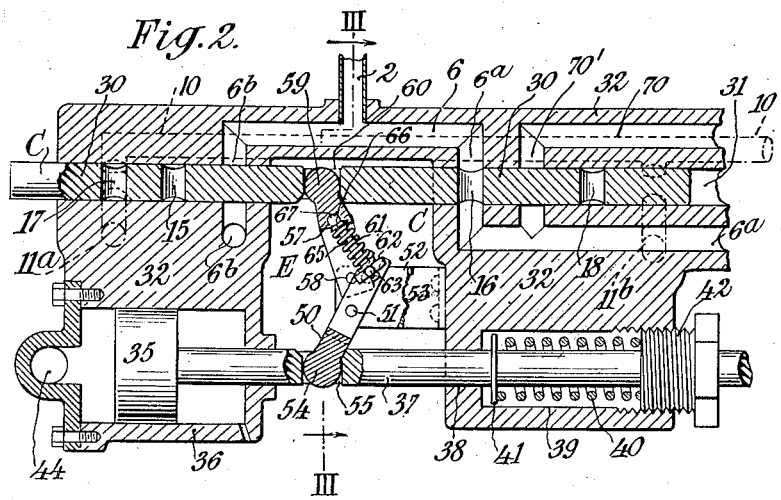
Fig. 2 is a vertical axial section taken through one embodiment of the automatic selector valve mechanism according to the present invention, this valve mechanism having the connections indicated in Fig. 1 through which the lubricant is circulated between said engine and one or the other of the reservoirs.
Figure 3:
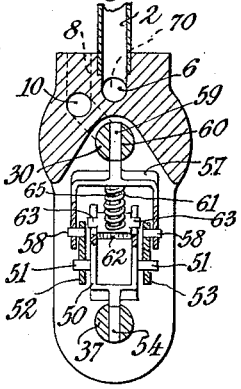
Fig. 3 is a cross-section taken along the line III—III of Fig. 2.

The details of the preferred form of automatic valve control mechanism are best seen in Figs. 2 and 3. In both these figures and in Fig. 1 the same reference characters relate to corresponding parts. The automatic valve control mechanism is omitted in Fig. 1 to avoid obscuring the various conduit connections. As hereinbefore described, the sliding plunger 30 which constitutes the movable element of the selector valve C is freely movable within a bore 31 formed in the valve block 32. The movement of the valve plunger 30 is controlled by a pressure-sensitive piston 35 operating in a cylinder 36 disposed beneath the said valve plunger, as shown in Fig. 2. A piston rod 37 secured to piston 35 extends across an opening in the valve block or frame 32 and is guided within a bore 38 at the left end of a chamber 39 which houses a spring 40. This spring surrounds the piston rod, and at its left end bears against a collar 41 secured to said rod. The other end of the spring seats against an adjusting plug 42 which is threaded into the end of the chamber 39. The outer end of this plug is accessible to permit of adjusting the tension of the spring. The cylinder 36 at its left end receives fluid under pressure through a conduit 44 which constitutes a branch of pressure conduit 6b (Fig. 1) through which oil is delivered under pressure by the pump 5b cooperating with reservoir B, as hereinbefore set forth.

It will thus be seen that the piston 35 will respond to whatever fluid pressure is generated by the "B" oil supply system and so long as the "B" system delivers oil to the engine at or above a predetermined pressure, the valve will maintain the said "B" system in normal communication with the engine. If for any reason the pressure falls below the minimum value determined by the adjustment of spring 40, said spring will induce a movement of piston rod 37 toward the left. This results in shifting the valve plunger 30 to the position in which it establishes communication between the "A" system and the engine, while at the same time cutting out the "B" system. Any suitable mechanical linkage may be provided between the pressure controlled piston and the valve plunger 30. In fact the two may be formed integrally, as will be seen in a modification hereinafter to be described.

In the present embodiment there is provided a type of so-called "limit" or "snap" linkage E between the pressure-sensitive piston and the valve plunger 30 which results in a rapid throw of the said plunger from either control position to the other regardless of the rapidity of movement of the pressure-controlled piston. This linkage not only insures a rapid and complete movement of the valve plunger from one control position to the other, but is preferably of such character as to maintain the plunger in a definite control position regardless of minor fluctuations in the position of the pressure-sensitive piston. In this manner the valve ports, except for the brief interval during which they are thrown from one control position to the other, are held either wide open or fully closed.

The linkage E in the construction shown in Figs. 2 and 3 consists of a forked arm 50 having trunnions 51 on opposite sides which are freely pivoted in fixed bracket arms 52, 53. The lower end 54 of arm 50 lies within a slot 55 formed in piston rod 37, the mutual engaging surfaces being formed as shown in Fig. 2, so that movement of the rod in either direction will induce a rocking movement of the forked arm 50 about the pivotal axis 51. A forked arm 57 of generally similar character to the above described arm 50 is mounted upon pivots 58 secured in the aforesaid bracket arms 52, 53. The upper end 59 of arm 57 lies within a slot 60 in valve plunger 30 and provides an operative connection therewith whereby any rocking of the arm 57 about its pivotal axis 58 will induce a longitudinal movement of the valve plunger. Between the oppositely-disposed forked ends of arms 50 and 57, a spring 61 is mounted. This spring at its lower end bears against a rocking plate 62 which is trunnioned at 63 between the ends of forked arm 50. The spring is guided upon a pin 65, which, at its lower end, slides in a bore formed in the aforesaid rocking plate 62. The upper end of pin 65 provides a shoulder 66 against which the upward thrust of spring 61 is exerted. The upper end of the pin is freely seated within a recess 67 in arm 57, the interengaging surfaces of the said arm and pin thus providing a connection which permits of the free rocking movement therebetween.

With the linkage in the position shown in Fig. 2 it will be seen that the lower end of spring 61 lies to the right of the pivotal axis 58 of arm 57. In this position the spring acts at such an angle as to develop a thrust which will force arm 57 and valve plunger 30 connected therewith to the left. If the piston 35 moves rod 37 to the right, the upper end of arm 50 will be swung to the left. In executing this movement the lower end of spring 61 will be carried to the left until it swings past the pivotal axis of arm 57. The spring then assumes an angle which will result in its exerting a thrust tending to move arm 57 to the right. This thrust carries the valve plunger 30 to its right hand control position, and this movement will occur independently of and at a speed which may greatly exceed the speed of movement of piston rod 37. The initial movement of the piston rod and arm 50 serves to compress the spring 61, but after the spring has been carried to dead center with relation to arm 57, any further movement of the lower end of the spring will cause the arm 57 to snap over to the extreme right hand position. This movement resulting from the release of energy stored in said spring will occur almost instantly and regardless of whether the piston-controlled arm 50 immediately moves to its extreme right hand position or very gradually attains such position with the building up of pressure in cylinder 36. Precisely the same "snap over" action will occur in the reverse direction upon any reduction of pressure in cylinder 36 which will permit the piston 35 to be moved to the left by spring 40 a sufficient distance to again bring the lower end of spring 61 into a position where the line of thrust of said spring tends to move arm 57 to the left.

There remains to be described an additional function of the selector valve whereby the oil delivery of pump 5a is automatically short circuited and returned through a by-pass 70 to the suction side of said pump. As seen in Figs. 1 and 2, the by-pass 70 is controlled by valve plunger 30. When the plunger is in its left hand position it blocks by-pass 70 so that no oil can flow from pressure conduit 6a upwardly through the vertical branch 70' of said by-pass. When the valve plunger is shifted to its right hand position the port 16, which, in the position shown, affords free passage for the oil through conduit 6a to the main supply conduit 2 of the engine, will register with the vertical branch 70' of the by-pass, so that the oil in conduit 6a will be idly returned to pump 5a instead of passing to the engine. The pump 5a may thus remain continuously operative and ready to supply oil to the engine whenever the other pump 5b fails to deliver the required oil pressure. The provision of an unobstructed path for by-passing the oil from pump 5a is advantageous not only because it permits said pump to remain operative and instantly available to deliver oil to the engine, but because while the idle short circuiting of the fluid occurs, the pump is not subjected to any appreciable load. While as hereinbefore set forth, the pump could be provided with a spring-loaded, pressure relief valve which would permit by-passing of the oil during the time that pump 5a is not in communication with the engine, this would involve an appreciable loss of energy due to the fact that the pump would always be operating under a certain load. This loss of energy is avoided through the above described operation of the mechanically actuated valve control.

It may be here pointed out that the above described automatic control for the selector valve will respond to a change in oil temperature which is of such magnitude as to indicate any dangerous overheating of the lubricant. This results from the well understood fact that the viscosity of oil diminishes with rising temperatures. If, due to overheating, the viscosity of the oil is reduced to a point where the oil flows with such freedom as to prevent the maintenance of the predetermined pressure for which the spring 40 of pressure-sensitive piston 35 is adjusted, the piston will be moved by said spring and will result in the automatic shifting of the selector valve 30 from the position in which it connects the "B" system to the engine to the position shown in Figs. 1 and 2, wherein the "A" system is connected. It will be understood that Figs. 1 and 2 show the selector valve and its automatic control mechanism in the position which the various parts assume when for any reason the oil supplied by the "B" reservoir is not delivered to the engine at a predetermined pressure. This failure of pressure may result either from overheating of the oil or because of exhaustion of the oil in the reservoir or as a result of breakage or derangement in the conduit or pump which delivers oil from said reservoir to the engine. The engine will thus be automatically protected against defective lubrication resulting either from mechanical derangement of one of the duplicated oil supply systems or because of abnormal heating of the oil which is circulated in such system. The latter protection is particularly important in aviation engines which operate continuously at or near their maximum power and which therefore subject the circulating oil to pronounced heating effects. Not infrequently special radiators are provided in the oil circulation system of such engines in order to attain a greater cooling effect than could be had solely through the circulation of oil through the external reservoir, and it will be understood that such radiators may be employed in conjunction with the present system.

As shown in Fig. 1, special valve mechanism according to the present invention may be provided for one or more of the reservoirs whereby to prevent loss of fluid therefrom in case of any derangement of the oil circulating system associated therewith. Should either the supply or return conduits connected with a reservoir provided with the aforesaid valve mechanism be broken or the circulation of oil otherwise interrupted, a valve controlling the outlet of said reservoir will automatically close. The remaining oil will thus be conserved and may be transferred to another reservoir in which the normal circulation may be maintained. The transfer of oil from one reservoir to the other may be effected at any time by operation of a cock or valve 75 which normally closes a conduit 76 connecting the two reservoirs. Upon the opening of this valve the oil level in the connected reservoirs will be equalized. If some defect develops in the pump or conduits which would prevent the further circulation of oil through the "B" reservoir, the valve 75 may be left in the open position and all the oil in the "B" reservoir will then be available for use in the "A" system.

The automatic valve mechanism for controlling the outlet of each reservoir consists of a clapper valve 77 carried upon an arm 78 which is pivoted at 79. The clapper valve in its closed position (as in reservoir B) seals the outlet 80 of the reservoir. The valve is controlled by a pressure-actuated piston 81 operating in cylinder 82, the piston being connected to the right hand end of valve arm 78 by connecting rod 83, as shown in Figs. 1 and 4. The piston is urged upwardly by a spring 84 confined between the bottom of said piston and a shoulder 85 at the lower end of cylinder 82. Said cylinder receives oil under pressure from the conduit through which the circulating oil is returned to the reservoir (return conduit 11a of reservoir A or 11b of reservoir B). It will be understood that the valve mechanism in both reservoirs is identical, although the parts as shown in Fig. 1 are in different relative positions due to the fact that, under the assumed conditions, the "B" reservoir has been cut off from the engine while the "A" reservoir is operatively connected in the circulating system.

It will be noted that the upper end of cylinder 82 provides a closed chamber 86 wherein the returning oil is confined until piston 81 moves downwardly a sufficient distance to open the clapper valve 77. A port 87 formed in the cylinder wall is uncovered by the further downward movement of piston 81 and thus permits free return of oil from chamber 86 to the reservoir. This is the position occupied by the piston appearing in reservoir A, in which reservoir the normal circulation of oil will occur. In reservoir B the piston 81 has been moved upwardly by spring 84 so as to close port 87. In order to insure that the clapper valve 77 will not close and cut off delivery of oil to the engine because of a momentary interruption in the return of oil to the said reservoir, there is provided a check valve in each of the return conduits 11a and 11b. One of these valves is shown in detail in Fig. 4. The movable valve element consists of a plunger 88 guided within a bore 89 formed in the head of piston 81. The upper end of this plunger is formed as a cone 90 adapted to bear against the conical valve seat 91 formed at the entrance to conduit 11a. A light spring 92 interposed between the conical head 90 and piston 81 tends to move the valve plunger upwardly, the plunger being retained within the piston bore by means of a pin 93 which engages the inner surface of the piston head. When piston 81 moves upwardly a sufficient distance to close the port 87, the plunger head 90 will be brought into yielding contact with valve seat 91 and will thus prevent any flow of oil upwardly through conduit 11a. Thereafter the piston in its upward movement will act as a dash-pot. A small port or vent 94 in the piston head permits the oil trapped above the piston to leak slowly into the reservoir so that the piston will be retarded in its upward movement. This delays the closing of clapper valve 77 so that should the loss of pressure in conduit 11a be of brief duration the reservoir outlet 80 will remain open, so that the delivery of oil to the engine is not interrupted.

It will be understood that the reservoirs may be used without the automatically controlled valve 77. Furthermore, the pressure-sensitive piston valve 81 may be employed to control clapper valve 77 without employing the check valve 88 and above described dash-pot action for the purpose of retarding the closure of clapper valve 77. The scavenging pump 9 and the conduits connecting it with the engine sump and the reservoir will normally retain a sufficient quantity of oil to insure the automatic opening of the clapper valve, and the return flow of this oil to the reservoir will continue for a sufficient period of time to insure the starting and maintenance of the normal circulation of oil through the engine. Consequently, except under unusual circumstances, there would be no necessity for providing any dash-pot arrangement for retarding the closure of the clapper valve.

A modified form of clapper valve for automatically controlling the reservoir outlet is shown in Fig. 5. In this construction no dash-pot action is provided. Within the reservoir the return conduit 11a communicates with a U-shaped passage 96, at the free end of which a valve member 97 is mounted. This member is free to swing upwardly about a pivot 98 so as to permit the free flow of oil, and such movement of the valve member will occur whenever the scavenging pump delivers oil through return conduit 11a. A similar valve member 99 controls the outlet 80 at the bottom of the reservoir. The two hinged valves are connected by a link 100 in such manner that when valve 97 is thrown open by the oil returning under pressure through conduit 11a, the outlet valve 99 will be opened simultaneously. Upon cessation of the flow through conduit 11a, both valves will drop into closed position automatically. A spring 101 interposed between a fixed abutment 102 and valve member 99 may be provided to insure the effective seating of said valve so as to prevent any loss of oil through the reservoir outlet.

In Figs. 6 and 7 there is shown a modified form of automatic selector valve according to the present invention. This valve is connected with the dual reservoirs and the engine lubricating system precisely as in the embodiment illustrated in Figs. 1 and 2. It is therefore unnecessary to describe in detail the various external connections. The valve plunger 30' has precisely the functions of plunger 30 in the first embodiment and is of similar construction except that the valve passages, instead of consisting of transverse bores through the plunger, are shown as annular grooves 15', 16', 17', 18'. These grooves may be caused to register with the various conduits formed in the valve casing to perform the function of selectively establishing the circulation of oil through either the "A" or "B" systems, as described in connection with the first embodiment. The conduits communicating with the engine and oil reservoirs are designated by the same reference characters as in Fig. 1, so that the complete circulating system will be readily understood by reference to that figure. It may be here noted that in Fig. 6 the valve plunger is shown in the right hand position in which it establishes a circulation of oil through the engine and the "B" reservoir, whereas in Figs. 1 and 2 the valve plunger is in the left hand position, which selectively establishes communication with the "A" reservoir.

In the present modification the valve plunger 30' is actuated directly by control piston 105 instead of through the quick-throw linkage E according to the first embodiment. As seen in Fig. 6, there is provided at the end of the valve casing a cylinder 106 coaxial with valve plunger 30'. The piston 105 secured to the end of said plunger is urged toward the left by a spring 106' interposed between the piston head and the right hand end of cylinder 106. The pressure conduit 44 constituting an extension of the delivery conduit 6b connected with the oil pressure pump 5b communicates directly with the cylinder chamber to the left of piston 105. Thus, whenever the pump 5b delivers oil from reservoir B under sufficient pressure to move piston 105 against the force of spring 106', the piston will carry the valve plunger 30' to the position indicated in Fig. 6. In this position the circulation of oil will be established between the engine and reservoir B, the oil being delivered through conduit 6b, annular valve passage 15' and thence to the main supply conduit 2 of the engine lubricating system. After being collected in the engine sump, the oil is returned by the scavenging pump through conduit 10, annular valve passage 18' and conduit 11b to reservoir B. In this position of the valve plunger 30' it will be noted that the delivery conduit 6a and return conduit 11a are closed, but the by-pass 70', 70, through which the oil from pump 5a is idly circulated, is open, the annular valve passage 16' registering with the passage 70' of said by-pass. As hereinbefore explained, the provision of this by-pass permits pump 5a to operate continuously, the valve passage 16' in one position establishing communication between the delivery conduit 6a of pump 5a and by-pass 70', and in its alternative position establishing communication through the vertical branch of conduit 6a so as to connect the pump with the main supply conduit 2 of the engine.

With the parts in the position shown in Fig. 6, the oil is continuously circulated between the "B" reservoir and the engine, both the delivery and return conduits of the "A" reservoir being closed. The "A" system is thus rendered inoperative except that the delivery pump of the latter system idly circulates oil through its by-pass 70' 70. This condition will continue so long as the "B" system remains intact and delivers oil under the required pressure to the engine bearings. If, due to exhaustion of the oil in the "B" reservoir, breakage of the conduits, failure of the delivery pump 5b or for any other reason the normal oil flow is not maintained in conduit 6b, the pressure-sensitive piston 105 will be moved by spring 106' to its left hand position, in which the valve plunger 30' connects the "A" reservoir with the engine and disconnects the "B" reservoir. Under this condition the by-pass 70', 70 of pump 5a will be closed and the delivery conduit 6a of said pump will communicate directly with the engine supply conduit 2, as hereinbefore set forth.

To permit of manually operating the selector valve, a rod 107 is provided. This rod is secured to the end of valve plunger 30' and extends freely through the end of valve casing 32, the rod being provided at its outer end with a hand grip 108 by which the operator may shift the valve plunger to either control position. If desired, the plunger may be secured in either control position by means of a suitable locking device, such, for example, as a lock pin which may be inserted through a transverse bore 109 in the valve casing and which will engage one or the other of corresponding bores 110, 111, formed in the rod extension 107 of valve plunger 30'. Such locking of the plunger would only be resorted to in the event that the operator for some reason desired to prevent the automatic operation of the selector valve. The locking device would permit the operator to set the valve so as to establish circulation selectively through one reservoir or the other, at will.

The operation of the apparatus according to the present invention has been fully set forth in connection with the foregoing detailed description, but may be here briefly summarized as follows:

The reservoirs A and B, which are initially filled with oil, are selectively put into communication with the engine through the action of a valve 30 (Fig. 1) or 30' (Fig. 6) which functions to disconnect both the delivery and return conduits of one reservoir when it is adjusted to connect the corresponding conduits of the other reservoir to the engine. In the preferred embodiment this selector valve is actuated automatically, so that upon failure of a part of the circulating system which is initially connected with the engine, the valve will automatically move into a new position where it cuts out the defective part of the system and establishes communication between the engine and the reserve lubricating system. This is accomplished by providing a selector valve which is sensitive to the oil pressure delivered by the oil pump associated with that reservoir which forms a part of the "normal" or "primary" supply system. So long as this system continues to function properly, the pressure-sensitive valve will be held in the position which permits the free circulation of oil through the said primary system (the system connected with reservoir B). Any failure of the primary system to deliver oil at a predetermined pressure will immediately cause the pressure-sensitive valve to shift to the position in which it places the "reserve" or "secondary" system (the system connected with reservoir A) in communication with the engine while at the same time automatically disconnecting the defective primary system. The selector valve may be actuated by a pressure-sensitive piston which is connected to the valve through a "quick-throw" or "snap over" linkage such as that provided in the embodiment of Figs. 2 and 3, or the selector valve may be actuated directly by the pressure-sensitive piston, as in the modified construction shown in Figs. 5 and 6. The provision of "snap over" linkage for rapidly throwing the selector valve from one control position to the other affords the advantage of eliminating any but a very minute interruption in the flow of oil to the engine when switching from the primary to the secondary supply systems and further insures the maintenance of the valve ports in their fully opened position regardless of such fluctuations in the oil pressure as would fall within the permissible limits of safe engine lubrication.

In order to prevent any material loss of oil from the reservoirs in the event of breakage of the conduits connected therewith, there is provided in each of said reservoirs an outlet valve which automatically closes whenever the flow of oil through the return conduit of such reservoir is cut off. One embodiment of this automatic reservoir valve is shown in Figs. 1 and 4, and a modified construction in Fig. 5. The operation of these valves has been hereinbefore described in detail.

While alternative forms of the present invention have been hereinbefore described and illustrated in the accompanying drawings, it will be understood that the invention is not limited thereto but may be otherwise variously modified and embodied without departing from the spirit of the invention set forth in the following claims.

What I claim is:

1. Reserve engine-lubricating apparatus, comprising a plurality of reservoirs, conduits through which the lubricant may flow from said reservoirs to the engine, valve means in said conduits, and means operatively connecting said valve means in such manner that the opening of one of said valve means will effect a closing movement of the other, whereby the lubricant in said reservoirs may be selectively supplied to said engine.

2. Reserve engine-lubricating apparatus, comprising a plurality of reservoirs, supply conduits through which the lubricant may flow from said reservoirs to the engine, return conduits through which said lubricant may be returned from said engine to said reservoirs, valve means in said supply and return conduits, and means operatively connecting said valve means in such manner that the opening of the valve means controlling the supply conduit from a selected reservoir will open the valve means controlling the return conduit to the same reservoir and will close the valve means controlling both the supply and return conduits of the other of said reservoirs.

3. Reserve engine-lubricating apparatus comprising two pumps, storage means supplying lubricant to said pumps, conduits through which said pumps may deliver lubricant under pressure to said engine, a by-pass through which one of said pumps may idly short-circuit its lubricant, valve means controlling said conduits and said by-pass, and means operatively connecting said valve means in such manner that the opening of the valve means controlling said by-pass will induce a closing movement of the valve means controlling the conduit of the pump which is thus short-circuited by the opening of said by-pass, and will simultaneously induce an opening movement of the valve means in the other of said conduits.

4. Reserve lubricating apparatus for use with an engine having a pressure-feed system for the circulation of lubricant through its bearings, said apparatus comprising first and second reservoirs adapted to be connected alternatively in the said lubricant-circulating system, and selector means movable to alternate control positions, said selector means in one of said positions establishing a path for the circulation of lubricant through the said first reservoir, and in another position establishing a path for the circulation of lubricant through the said second reservoir, the said selector means in each of said positions preventing the establishment of a path for the circulation of lubricant through both of said reservoirs simultaneously.

5. Reserve lubricating apparatus for use with an engine having a pressure-feed system for the circulation of lubricant through its bearings, said apparatus comprising first and second reservoirs adapted to be connected alternatively in the said lubricant-circulating system, selector means movable to alternate control positions, said selector means in one of said positions establishing a path for the circulation of lubricant through the said first reservoir, and in another position establishing a path for the circulation of lubricant through the said second reservoir, the said selector means in each of said positions preventing the establishment of a path for the circulation of lubricant through both of said reservoirs simultaneously, and pressure-sensitive means responsive to the pressure in the pressure-feed system containing one of the reservoirs adapted to control the position of said selector means.

6. Reserve lubricating apparatus for use with an engine having a pressure-feed system for the circulation of lubricant through its bearings, said apparatus comprising first and second reservoirs adapted to be connected alternatively in the said lubricant-circulating system, selector means movable to alternate control positions, said selector means in one of said positions establishing a path for the circulation of lubricant through the said first reservoir, and in another position establishing a path for the circulation of lubricant through the said second reservoir, the said selector means in each of said positions preventing the establishment of a path for the circulation of lubricant through both of said reservoirs simultaneously, pressure-sensitive means adapted to control the shifting of said selector means, and limit means adapted to prevent the said shifting of the said selector means from one of its control positions to the other except at a predetermined limiting pressure.

7. Reserve lubricating apparatus for use with an engine having a pressure-feed system for the circulation of lubricant through its bearings, said apparatus comprising first and second reservoirs adapted to be connected alternatively in said lubricant-circulating system, selector means adapted in different positions to connect selectively one and the other of said reservoirs in said circulating system, a spring adapted to actuate said selector means, and release means adapted in one position to restrain the spring actuation of said selector means and in another position to permit such actuation.

8. Reserve engine-lubricating apparatus comprising reservoirs independently adapted to supply lubricant to bearings of an engine, delivery and return conduits between said reservoirs and said engine bearings, pumping means to circulate said lubricant, valve mechanism in said conduits adapted to alternatively close the said conduits of one or the other of said reservoirs, spring-actuated means for rapidly throwing said valve mechanism from one alternative position to the other, and trip means to release said spring-actuated means.

9. Reserve engine-lubricating apparatus comprising two independent sources of lubricant adapted to be selectively connected to said engine, and automatic selector means adapted upon failure of the flow of lubricant of one of said sources to disconnect said source from, and to connect the other source to, said engine.

10. Reserve engine-lubricating apparatus comprising lubricating means alternatively operative to supply lubricant under pressure to bearings of said engine, one of said lubricating means being normally operative and the other normally inoperative for the described purposes, and pressure-sensitive selector means adapted to render operative the said normally inoperative lubricating means when the pressure of the lubricant supplied to said bearings falls below a predetermined value.

11. Reserve engine lubricating apparatus comprising first and second reservoirs adapted to be selectively connected to supply lubricant to bearings of said engine, pumping means normally adapted to generate sufficient pressure to force an adequate supply of said lubricant to said bearings, and pressure-sensitive selector means adapted to disconnect said first reservoir from, and to connect the second reservoir to, said engine, upon a predetermined change in the pressure of the lubricant supplied to said bearings.

12. In a dual system for supplying oil or other fluid to an engine, the combination of two reservoirs, individual pumps cooperating with each of said reservoirs to deliver fluid to said engine, conduits connecting said pumps with said reservoirs and said engine, valve means operating to alternatively close the conduits between said pumps and said engine, and pressure-sensitive means responding to fluid pressure generated by one of said pumps, said latter means being adapted to control the operation of said valve means whereby upon failure of said pump to develop a predetermined pressure the said valve means will move to disconnect said pump and to connect the other of said pumps to the engine.

13. In a dual system for supplying oil or other fluid to an engine, the combination of two conduits through which fluid may be independently supplied for use in said engine, mechanically interconnected valve means in said conduits, said valve means being adapted in alternative control positions to selectively open each of said conduits and close the other, valve-actuating means adapted to effect a rapid shifting of said valve means from one control position to the other, and automatic control means adapted to render operative said valve-actuating means in response to a change in the pressure due to the condition of the fluid supplied to said engine.

14. In a dual system for supplying oil or other fluid to an engine, the combination of two reservoirs, individual conduits through which fluid flows from said reservoirs, a connection between said conduits and said engine, mechanically interconnected valve means in said conduits, said valve means being adapted in alternative control positions to selectively open each of said conduits while closing the other, movably mounted spring means adapted in different operating positions to throw said valve means from either of said control positions to the other, and control means for moving said spring means to said different operative positions.

15. Reserve lubricating apparatus for use with an engine having a pressure-feed system for the circulation of lubricant through its bearings, said apparatus comprising two reservoirs each adapted to be connected in said lubricant-circulating system independently of the other, valve means adapted respectively in alternative control positions to connect one or the other of said reservoirs selectively in said circulating system, and means responsive to excessive temperature of the lubricant in the pressure-feed system containing one of the reservoirs adapted to effect the shifting of said valve means from one control position to the other when the circulating lubricant reaches a predetermined temperature.

16. Lubricating apparatus to be used with engines employing a pressure-feed circulating system for circulating lubricant through the engine bearings, said apparatus comprising a plurality of reservoirs adapted to be selectively connected in the said lubricant circulating system, outlet and inlet passages for said reservoirs, an outlet valve individually controlling each of said outlet passages, automatic fluid-sensitive means controlling said valves, said automatic means responding to the lubricant returning to the reservoirs through their individual inlet passages and so controlling the outlet valve of each reservoir as to automatically check the delivery of lubricant therefrom upon failure of the return flow of lubricant through the inlet passage of such reservoir, and selector means controlling the passages of the said reservoirs, said means being adapted to place a selected reservoir in communication with the lubricant-circulating system and to interrupt the communication of the other of said reservoirs with such system.

17. Lubricating apparatus to be used with engines employing a pressure-feed circulating system for circulating lubricant through the engine bearings, said apparatus comprising a reservoir adapted to be connected in the said lubricant-circulating system, outlet and inlet passages for said reservoir, a valve controlling said outlet passage, automatic valve-actuating means, a fluid-sensitive detector controlling said means, said detector responding to the lubricant returning to the reservoir through said inlet passage and so controlling said valve-actuating means that the said valve will be held open as long as the return flow of lubricant to the reservoir remains normal, a second reservoir adapted to be connected in said lubricant-circulating system, outlet and inlet passages for said second reservoir, and valve means controlling the passages of both said reservoirs whereby one or the other reservoir may be selectively cut out of the said lubricant-circulating system.

18. Lubricating apparatus to be used with engines employing a pressure-feed circulating system for circulating lubricant through the engine bearings, said apparatus comprising a reservoir adapted to be connected in the said lubricant-circulating system, outlet and inlet passages for said reservoir, a valve controlling said outlet passage, yielding means tending to close said valve, means sensitive and responsive to the pressure of the lubricant returning through said inlet passage, said means being adapted to control said valve whereby to check the delivery of lubricant from said reservoir upon failure of the normal return of lubricant to said reservoir, a second reservoir adapted to be connected in said lubricant-circulating system, outlet and inlet passages for said second reservoir, and valve means controlling the passages of both said reservoirs whereby one or the other reservoir may be selectively cut out of the said lubricant-circulating system.

19. A reserve engine lubricating apparatus comprising in combination two lubricant reservoirs, conduits through which said reservoirs may feed lubricant to said engine, a selector valve controlling the flow of lubricant in said conduits, said valve being shiftable to alternative positions wherein a different one of said conduits is opened to said engine while the other of said conduits is closed, a passage through which fluid may flow from one of said reservoirs to the other, and a valve controlling said passage so that when the lubricating system through one of the conduits is rendered inoperative the total amount of lubricant in the reservoir connected to said inoperative system may be rendered available in addition to the lubricant in the reserve reservoir by opening the valve in the passage connecting the two reservoirs.

HENRY M. SHORT.